United States Patent [19]
Zugel Martin J.

[11] 3,835,723

[45] Sept. 17, 1974

[54] INTERMITTENT MOTION DEVICE
[75] Inventor: Zugel Martin J., Cleveland, Ohio
[73] Assignee: Cyclo Index Corporation, Cleveland, Ohio
[22] Filed: Sept. 4, 1973
[21] Appl. No.: 393,716

[52] U.S. Cl. ................................ 74/436, 74/820
[51] Int. Cl. ... F16h 55/04, F16h 27/04, B23q 17/02
[58] Field of Search .................. 74/436, 820, 84

[56] References Cited
UNITED STATES PATENTS
3,485,965  12/1969  Bleibtreu et al. ............. 74/436 X
3,546,958  12/1970  Parks ................................. 74/436

*Primary Examiner*—Leonard H. Gerin
*Attorney, Agent, or Firm*—Donnelly, Maky, Renner & Otto

[57] ABSTRACT

An indexing mechanism includes a rotable driven device having slots and a rotatable driving device having pins engageable with the slots for accelerating and decelerating the driven device. The driven device has rollers engageable with the outer periphery of the driving device for locking the driven device against rotation when it is not being indexed by the pins.

5 Claims, 5 Drawing Figures

PATENTED SEP 17 1974　　　　　　　　3,835,723

INTERMITTENT MOTION DEVICE

BACKGROUND OF THE INVENTION

This application pertains to the art of indexing mechanisms, and more particularly to an indexing mechanism generally of the type described in U.S. Pat. No. 3,443,455 issued May 13, 1969, to Martin J. Zugel, the disclosure of which is hereby incorporated herein by reference. The indexing mechanism includes a rotatable driven device having a pair of spaced apart oppositely disposed circular slots. A rotatable driving device has a pair of angularly spaced pins sequentially receivable in the slots for accelerating and decelerating the driven device. The driven device also has outwardly extending arcuate locking shoes engageable with a cylindrical hub on the driving device for holding the driven device against movement between indexing movements thereof. The outwardly extending locking shoes add a significant mass to the driven device which must be accelerated and decelerated during each indexing movement, and such locking shoes also require the use of more material for the driven device thereby making it more expensive. Extremely close tolerances must also be machined on the locking shoes and cylindrical hub to avoid backlash.

SUMMARY OF THE INVENTION

In accordance with the present invention, an indexing mechanism of the type described is modified by replacing the locking shoes with a pair of angularly spaced rollers positioned adjacent the slots on the driven device. The rollers engage a circular peripheral surface on the driving device for locking the driven device against movement between indexing movements thereof. The periphery of the driven device lies at a predetermined radius from the axis of rotation of the driving device, whereas the roller engaging surfaces lie on the periphery of a circle having a radius from the axis of rotation of the driven device which is slightly smaller than such predetermined radius so that the rollers are preloaded. Preloading the rollers in this manner eliminates backlash and positively holds the driven device in its indexed position while the driving device continues to rotate.

Although rollers are broadly known for use with indexing mechanisms, not the use of preloaded locking rollers in an indexing mechanism of the type described.

It is therefore a principal object of the present invention to provide an improved locking arrangement for an indexing mechanism which is simpler and more reliable than previous known locking arrangements.

Another object is to provide a preloaded locking arrangement for an indexing mechanism.

A further object is to provide a preloaded roller-type of locking arrangement for an indexing mechanism of the type including a rotatable driving device having angularly-spaced pins engageable with slots in a rotatable driven device for accelerating and decelerating the driven device.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

DESCRIPTION OF A PREFERRED EMBODIMENT

Figure 1:
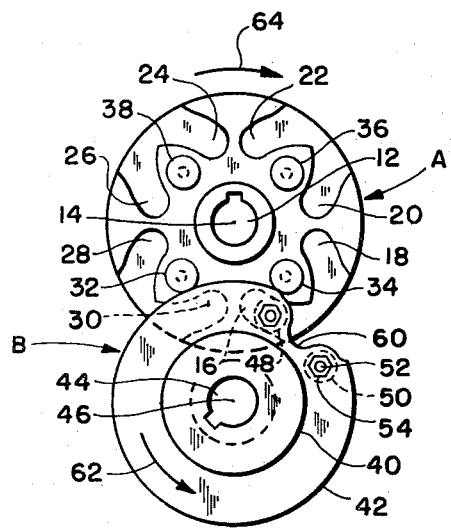
FIG. 1 is an elevational view of a preferred form of indexing mechanism constructed in accordance with the present invention.

Referring now to the drawings, wherein the showings are for purposes of illustrating a preferred embodiment of the invention only and not for purposes of limiting same, FIG. 1 shows an indexing mechanism including a rotatable driven device A and a rotatable driving device B.

Driven device A comprises a flat circular disc suitably secured to a shaft 12 for rotation about axis 14. One face of driven device A is recessed to provide one or more pairs of spaced-apart oppositely disposed generally circular slots 16 and 18, 20 and 22, 24 and 26, and 28 and 30.

Driven device A also has a plurality of circumferentially spaced rollers 32, 34, 36 and 38 secured thereto. Rollers 32–38 extend outwardly from the same face of driving device A in which slots 16–30 are formed adjacent sink slots.

Driving device B comprises a flat circular disc having an integral central hub 40 and a circular outer peripheral surface portion 42. Driving device B is mounted on a shaft 44 rotatable about axis 46. A pair of angularly spaced pins 48 and 50 are mounted on driving device B ajdacent the outer periphery thereof, such pins preferably being rotatable rollers mounted on shafts as at 52 extending through suitable holes in driving device B and secured thereto by nuts 54.

Driven device A and driving device B are mounted in slightly overlapping relationship with pins 48 and 50 extending toward driven device A for reception in slots 16–30 as shown. Outer peripheral surface 42 on driving device B lies at a predetermined radius from axis 46. Each pair of rollers on driven device A, such as pair of rollers 32 and 34 in FIG. 1, have roller surfaces engaging such outer peripheral surface 42 and preferably lying on the periphery of a circle having a radius from axis 46 which is slightly smaller than the predetermined radius at which peripheral surface 42 lies from axis 46 to preload each pair of rollers so that they are in firm engagement with peripheral surface 42. Outer peripheral surface 42 on driving device B is also arcuately recessed as at 60 between pins 48 and 50 for accommodating one roller as driven device A is indexed.

Figure 2:
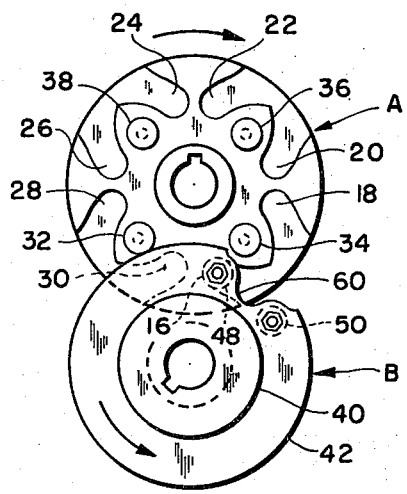
FIG. 2 is an elevational view similar to FIG. 1 but showing the indexing mechanism in a different rotated position.
Figure 3:
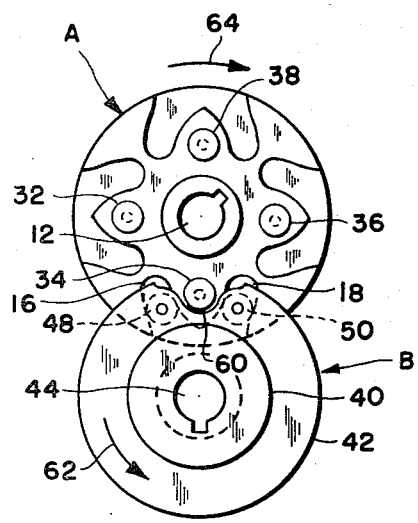
FIG. 3 is an elevational view similar to FIGS. 1 and 2 but showing the indexing mechanism in a further rotated position.
Figure 4:
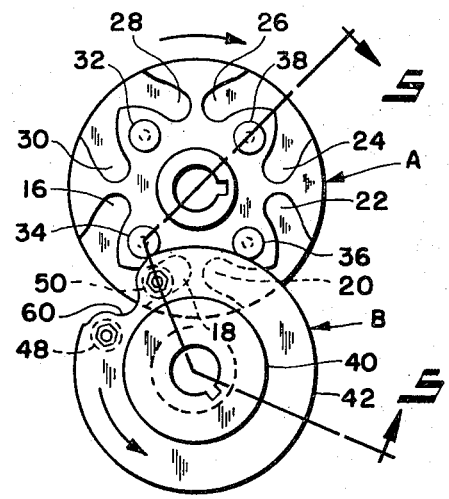
FIG. 4 is an elevational view similar to FIGS. 1-3 but showing the indexing mechanism in a still further rotated position.
Figure 5:
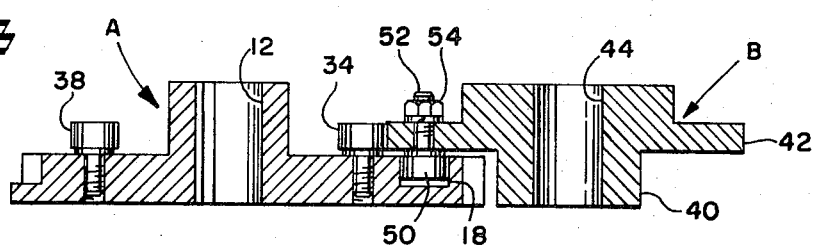
FIG. 5 is a cross-sectional view looking generally in the direction of arrows 5—5 of FIG. 4.

Driving device B is rotatably driven counterclockwise as indicated by arrow 62 for rotatably indexing driven device A clockwise as indicated by arrow 64. With the parts positioned as described, the pair of rollers 32 and 34 are preloaded in firm engagement with outer peripheral surface 42 on driving device B. As driving device B continues to rotate, first pin or roller 48 moves into slot 16 and begins to rotatably accelerate driven device A so that it moves to the general position shown in FIG. 2. As acceleration of driven device A continues, roller 32 moves away from outer peripheral surface 42, while roller 34 begins moving into arcuate recess 60. The second pin or roller 50 will then move into slot 18 as shown in FIG. 3 for decelerating driven device A. As second pin 50 begins moving out of slot 18 as shown in FIG. 4, the next pair of rollers 34 and 36 will move into firm preloaded engagement with peripheral surface 42 on driving device B for positively holding driven device A against rotation. Driving device B continues to rotate until first pin 48 engages slot 20 which again accelerates driven device A until seocnd pin 50 is eventually received in the slot 22 which decelerates driven device A as before. After another indexing movement, rollers 36 and 38 will once again engage the outer peripheral surface 42 for positively holding driven device A against rotation.

The arrangement shown and described includes four pair of opposite slots for indexing driven device A 90° for each 360° of rotation of driving device B. However, it will be apparent that only one pair of opposite slots and one pair of locking rollers may be provided on driven device A. Such an arrangement is shown and described with reference to FIG. 3 of the aforementioned Zugel patent. In such an arrangement, both the driven and driving device have gears thereon. After the driven device is accelerated by the first pin on the driving device, the gears engage so that the driven device is rotated to a position wherein the second pin on the driving device engages the second slot on the driven device for decelerating the same.

Arrangements including two or more pairs of oppositely disposed slots are also possible. In arrangements having three or more pairs of slots, the plurality of locking rollers include one roller which is common to a pair of locking rollers. For example, roller 34 is a common roller to make a pair with either roller 32 or roller 36. Each other roller is also common to another pair of locking rollers.

The locking roller arrangement makes it possible to mold or cast driving device B in one-piece so that hub 40 is integral therewith. In the previous arrangement using arcuate locking shoes, it was necessary to provide a separate hub machined to very accurate tolerances. The locking roller arrangement also makes it possible to have substantially zero backlash subsequent to each indexing movement. Positioning the pair of locking rollers so that their engaging surfaces lie on the periphery of a circle having a slightly smaller radius than the circle on which peripheral surface 42 of driving device B lies insures preloading of the locking arrangement so that no backlash can occur.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. An indexing mechanism, comprising; a rotatable driven device having a pair of spaced oppositely disposed circular slots, a rotatable driving device having first and second angularly spaced pins, said first pin being movable into one of said slots during rotation of said driving device to rotatably accelerate said driven device, and said second pin being movable into the other of said slots for decelerating and stopping said driven device, releasable locking means for releasably locking said driven device against rotation while said driving device continues to rotate with said pins disengaged from said slots, said locking means including a pair of angularly spaced rollers on said driven device adjacent said slots, said driving device having a rotational axis and a circular peripheral surface portion lying at a predetermined radius from said axis, said rollers engaging said peripheral surface at angularly spaced locations with roller engaging surfaces on said rollers lying on the periphery of a circle having a radius from said axis which is slightly smaller than said predetermined radius for preloading said rollers, said driving member having a recess between said pins for receiving one of said rollers when said driven device is accelerated by said first pin.

2. The mechanism of claim 1 wherein said driving device includes a one-piece hub and disc.

3. The mechanism of claim 2 wherein said driven device includes three pairs of slots and three equiangularly spaced rollers forming three pairs of rollers with each of said three rollers being common to two of said three pairs of rollers.

4. The mechanism of claim 2 wherein said driven device includes four pairs of said slots and four equiangularly spaced rollers forming four pairs of rollers with each of said four rollers being common to two of said four pairs of rollers.

5. The mechanism of claim 2 further including cooperating gear means integral with said driven device and driving device for rotatably driving said driven device by rotation of said driving device subsequent to acceleration of said driven device by said first pin and prior to deceleration of said driven device by said second pin.

* * * * *